United States Patent [19]

Flowtow et al.

[11] Patent Number: 5,353,902

[45] Date of Patent: Oct. 11, 1994

[54] ELECTRIC ACTUATOR ASSEMBLY FOR CLUTCH

[75] Inventors: Richard A. Flowtow, Butler; Curtis L. Fee, Auburn; J. Michael Lewis, Corunna, all of Ind.

[73] Assignee: Dana Corporation, Toledo, Ohio

[21] Appl. No.: 899,351

[22] Filed: Jun. 16, 1992

[51] Int. Cl.$^5$ ............... F16D 23/14; F16D 23/00
[52] U.S. Cl. .................... 192/84 R; 192/90; 192/99 S
[58] Field of Search .......... 192/84 R, 90, 3.56, 192/94, 99 S, 70.3; 74/102, 104, 89.15

[56] References Cited

U.S. PATENT DOCUMENTS

| | | | |
|---|---|---|---|
| 115,792 | 6/1871 | Waldo | 192/94 X |
| 132,234 | 10/1872 | Bates | 192/94 |
| 696,973 | 4/1902 | Holmes | 192/99 S |
| 1,945,496 | 1/1934 | Sloan et al. | 318/475 |
| 2,040,035 | 5/1936 | Trott | 192/99 S X |
| 2,072,832 | 3/1937 | Weydell | 192/3.56 |
| 2,409,385 | 10/1946 | Pletcher | 464/88 X |
| 2,945,691 | 7/1960 | Swift et al. | 464/88 X |
| 3,046,759 | 7/1962 | Deford et al. | 464/88 |
| 3,400,610 | 9/1968 | Taylor et al. | 192/99 S X |
| 3,575,378 | 4/1971 | Fawkes | 74/89.15 X |
| 3,702,545 | 11/1972 | Schlotmann et al. | 464/88 X |
| 3,774,462 | 11/1973 | Thompson | 74/89.15 |
| 3,823,577 | 7/1974 | Smith | 464/88 |
| 4,354,396 | 10/1982 | Charles | 74/104 |
| 4,425,814 | 1/1984 | Dick | 74/89.15 |
| 4,428,471 | 1/1984 | Parker et al. | 192/99 S X |
| 4,529,077 | 7/1985 | Renaud | 192/99 S |
| 4,579,012 | 4/1986 | Mabie et al. | 74/89.15 |
| 4,585,216 | 4/1986 | Boyer et al. | 267/150 |
| 4,650,056 | 3/1987 | Sevennec et al. | 192/90 |
| 4,651,855 | 3/1987 | Grunberg | 192/0.032 |
| 4,671,400 | 6/1987 | Grunberg et al. | 192/84 R X |
| 4,744,450 | 5/1988 | Bertin et al. | 192/84 R X |
| 4,750,596 | 6/1988 | Grunberg et al. | 192/7 |
| 4,773,516 | 9/1988 | Parzefall | 192/99 S X |
| 4,825,714 | 5/1989 | Yamanaka et al. | 74/89.15 |
| 4,828,093 | 5/1989 | Bertin et al. | 192/90 |
| 4,829,221 | 5/1989 | Grunberg et al. | 318/587 |
| 4,852,419 | 8/1989 | Kittel et al. | 74/89.14 |
| 4,860,870 | 8/1989 | Romig | 192/99 S |
| 4,865,173 | 9/1989 | Leigh-Monstevens et al. | 192/0.02 R |
| 4,878,396 | 11/1989 | Grunberg | 74/518 |
| 4,890,711 | 1/1990 | Carmillet et al. | 192/98 |
| 4,895,236 | 1/1990 | Sakakibara et al. | 192/84 R |
| 4,987,788 | 1/1991 | Bausch | 74/89.15 |
| 5,065,850 | 11/1991 | Bertin et al. | 192/90 |
| 5,069,088 | 12/1991 | Tanaka | 74/89.15 |
| 5,139,460 | 8/1992 | Hoyt et al. | 464/88 |

FOREIGN PATENT DOCUMENTS

| | | | |
|---|---|---|---|
| 3819039 | 12/1988 | Fed. Rep. of Germany | 192/84 R |
| 2610262 | 8/1988 | France | 192/84 R |
| 2117076 | 10/1983 | United Kingdom | 192/84 R |

*Primary Examiner*—Rodney H. Bonck
*Attorney, Agent, or Firm*—MacMillan, Sobanski & Todd

[57] ABSTRACT

An actuator for effecting engagement and disengagement of a friction clutch includes a bi-directional electric motor which is mounted on a bracket secured to a housing. The motor includes an output shaft which is connected through a flexible coupling to a ball screw shaft. A nut is mounted on the ball screw shaft such that rotational movement of the ball screw shaft causes axial movement of the nut. An enlarged collar is mounted on the nut for movement therewith. The collar is pivotably connected to a yoke secured to the upper end of a shift arm of the clutch. This pivotable connection is accomplished by a pair of posts connected to the collar which extend through respective slots formed in the legs of the yoke. The lower end of the shift arm is connected through a shift shaft to cause movement of the release bearing of the clutch in a known manner. Consequently, pivoting movement of the shift arm by operation of the motor causes engagement and disengagement of the clutch. Rotation of the output shaft of the motor in a first direction causes engagement of the clutch, while rotation of the output shaft of the motor in a second direction causes disengagement of the clutch. The operation of the motor can be controlled by an electronic control circuit.

23 Claims, 5 Drawing Sheets

ELECTRIC ACTUATOR ASSEMBLY FOR CLUTCH

BACKGROUND OF THE INVENTION

This invention relates in general to friction clutches and in particular to an electric actuator assembly for effecting engagement and disengagement of such a clutch.

Clutches are well known devices which are frequently employed in vehicles to selectively connect a source of rotational power, such as the crankshaft of an engine, to a driven mechanism, such as a transmission. Typically, a cover of the clutch is connected to a flywheel carried on the end of the engine crankshaft for rotation therewith. Between the flywheel and the clutch cover, a pressure plate is disposed. The pressure plate is connected for rotation with the flywheel and the cover, but is permitted to move axially relative thereto. A release bearing is connected to the pressure plate such that axial movement of the release bearing causes corresponding axial movement of the pressure plate. A driven disc assembly is disposed between the pressure plate and the flywheel. The driven disc assembly is carried on an output shaft of the clutch, which forms the input to the transmission.

Means are provided for selectively moving the release bearing (and, therefore, the pressure plate) back and forth in the axial direction. When the pressure plate is moved toward the flywheel, the driven disc assembly is frictionally engaged therebetween so as to cause the output shaft of the clutch to rotate with the flywheel, the cover, and the pressure plate. When the pressure plate is moved away from the flywheel, the driven disc assembly is released from such frictional engagement so as to disconnect this driving connection. In some clutches (pull-to-release type), movement of the release bearing in an axial direction causes movement of the pressure plate in the same axial direction. In other clutches (push-to-release type), movement of the release bearing in an axial direction causes movement of the pressure plate in the opposite axial direction.

In either instance, the means for moving the release bearing axially back and forth typically includes a rotatable shift shaft which extends transversely through the clutch. The shift shaft is provided with a fork or similar structure which engages the release bearing. Rotation of the shift shaft in a first rotational direction causes movement of the release bearing in one axial direction. Similarly, rotation of the shift shaft in a second rotational direction causes movement of the release bearing in the opposite axial direction. Thus, rotation of the shift shaft causes movement of the pressure plate and, therefore, engagement and disengagement of the clutch.

To effect the rotational movement of the shift shaft, a shift arm is connected to one end thereof outside of the clutch. Thus, pivoting movement of the shift arm causes rotational movement of the shift shaft to engage and disengage the clutch. In the past, movement of the shift arm has been accomplished by means of a mechanical linkage extending between the shift arm and a clutch pedal located within the driver compartment of the vehicle. As is well known, depression of the clutch pedal caused movement of the shift arm in one direction to rotate the shift shaft, causing disengagement of the clutch. Similarly, release of the clutch pedal caused movement of the shift arm in another direction to rotate the shift shaft, causing engagement of the clutch. Also, it is known to provide a hydraulic connection between the shift arm and the clutch pedal for a similar purpose.

Although mechanically and hydraulically actuated shift assemblies as described above have been used successfully for years, it has been found desirable to provide some other means for selectively moving the release bearing and the pressure plate between the engaged and disengaged positions. Specifically, it has been found that it would be desirable to effect engagement and disengagement of the clutch by an electrically actuated shift mechanism. Such an electric actuator would eliminate the force transmitting mechanism between the operator and the clutch, resulting in a reduced number of parts, decreased assembly time, and minimal maintenance. Also, an electric actuator would relieve the driver from manually exerting a large force against the clutch pedal each time it is desired to disengage the clutch. Lastly, an electric actuator could be easily adapted for use with an electronic control system for automating the operation of the clutch in response to the operating conditions of the vehicle.

SUMMARY OF THE INVENTION

This invention relates to an improved structure for a friction clutch including an electric actuator assembly for effecting engagement and disengagement thereof. In a first embodiment of the invention, the electric actuator includes a bi-directional electric motor which is mounted on the exterior of the transmission housing. The electric motor includes an output shaft which is connected through a flexible coupling to a ball screw shaft. A nut is mounted on the ball screw shaft such that rotational movement of the ball screw shaft causes axial movement of the nut. A collar is mounted on the nut for axial movement therewith. The collar has a pair of outwardly extending posts provided thereon. The posts extend through respective slots formed in the legs of a yoke secured to the upper end of a shift arm for the clutch. Thus, the collar is pivotably connected to the yoke and the shift arm. The lower end of the shift arm is connected through a shift shaft to cause movement of the release bearing of the clutch in a known manner. Rotation of the output shaft of the motor in a first direction causes pivoting movement of the shift arm in a first direction, causing engagement of the clutch. Rotation of the output shaft of the motor in a second direction causes pivoting movement of the shift arm in a second direction, causing disengagement of the clutch. The operation of the motor can be controlled by any known electronic control circuit.

In a second embodiment of the invention, the electric actuator includes a bi-directional electric motor which is mounted within the interior of the transmission housing. The electric motor includes an output shaft which is connected through a gear reduction train to a ball screw shaft. A nut is mounted on the ball screw shaft such that rotational movement of the ball screw shaft causes axial movement of the nut. A collar is mounted on the nut for axial movement therewith. The collar has a pair of outwardly extending posts provided thereon. The posts extend through respective slots formed in the legs of a yoke secured to the lower end of a shift member for the clutch. The upper end of the shift member is pivotably mounted on a spring loaded hanger secured to the transmission housing. The legs of the yoke engage respective protrusions formed on the release bearing of the clutch to effect movement thereof when the shift member is pivoted. Rotation of the output shaft of the motor in a first direction causes pivoting movement of the shift member in a first direction, causing disengagement of the clutch. Rotation of the output shaft of the motor in a second direction causes pivoting movement of the shift member in a second direction, causing engagement of the clutch.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
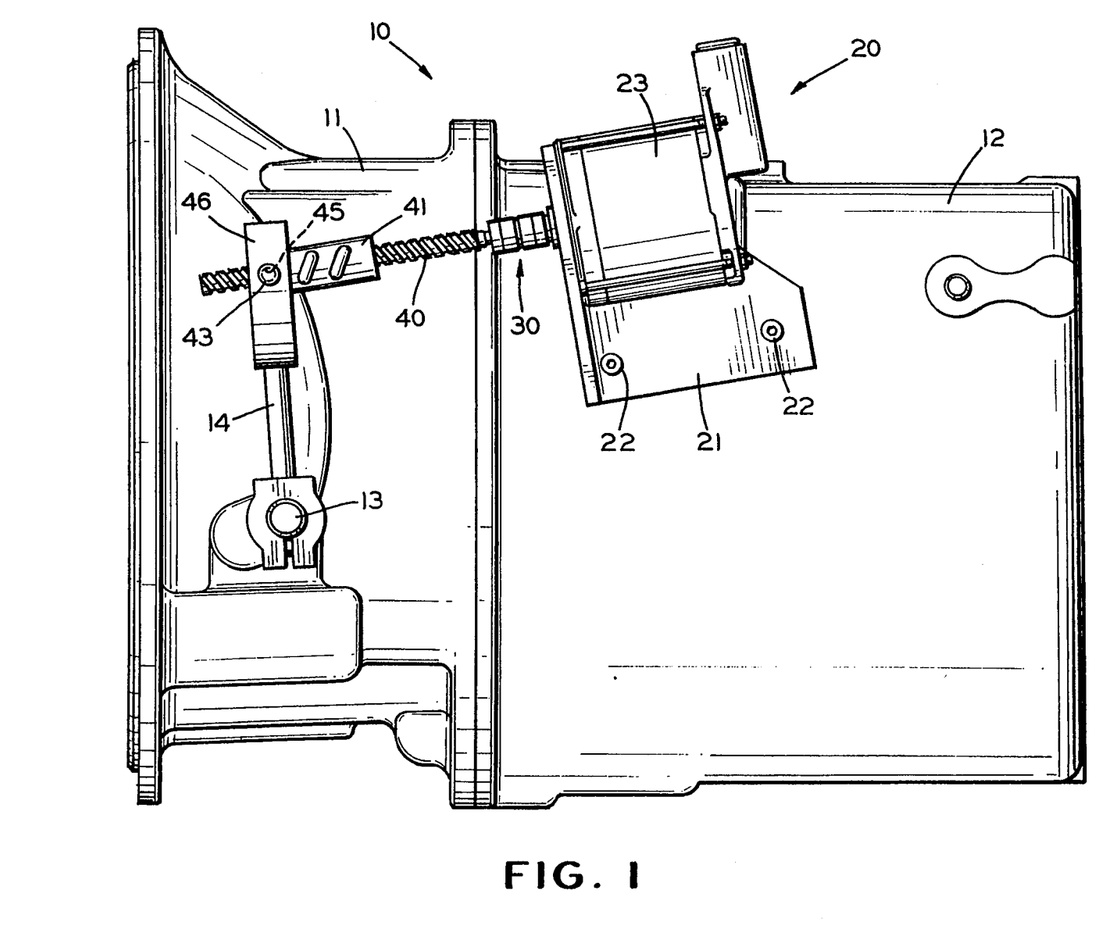
FIG. 1 is a side elevational view of a housing for a clutch and transmission including a first embodiment of an electric actuator assembly for operating the clutch in accordance with this invention.
Figure 2:
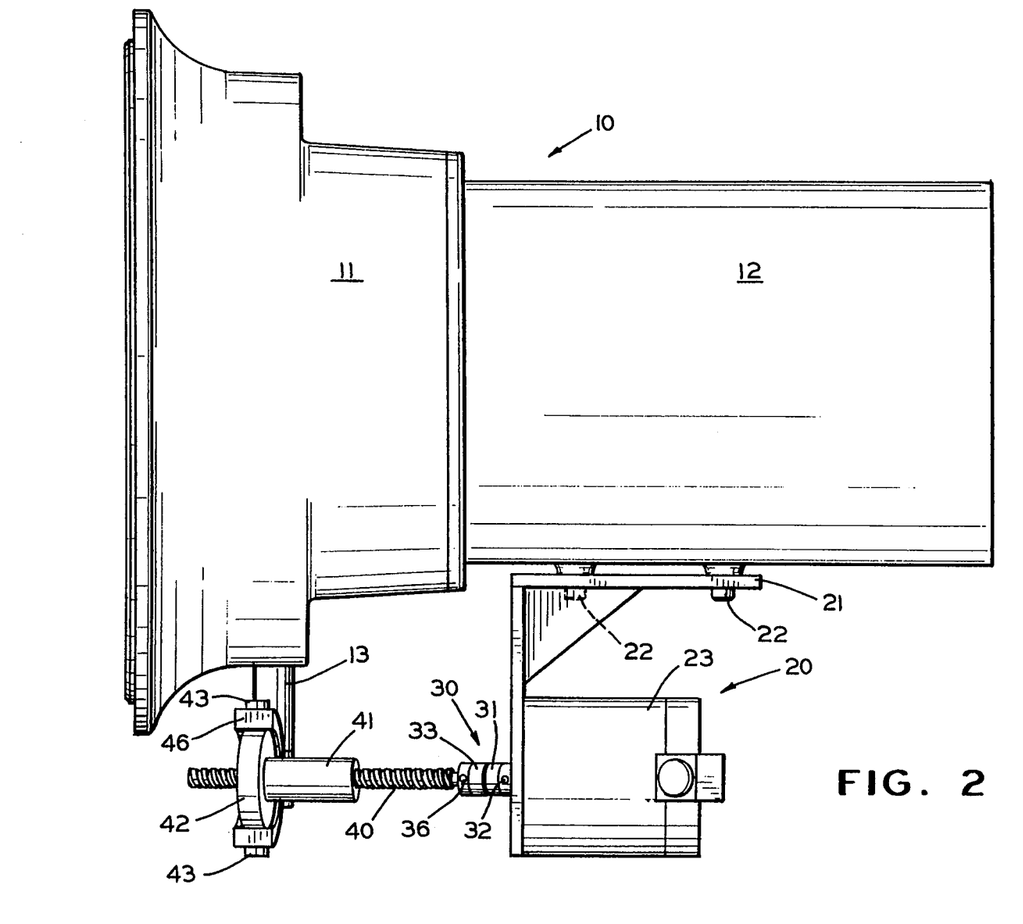
FIG. 2 is a top plan view of the housing and electric actuator assembly shown in FIG. 1.
Figure 3:
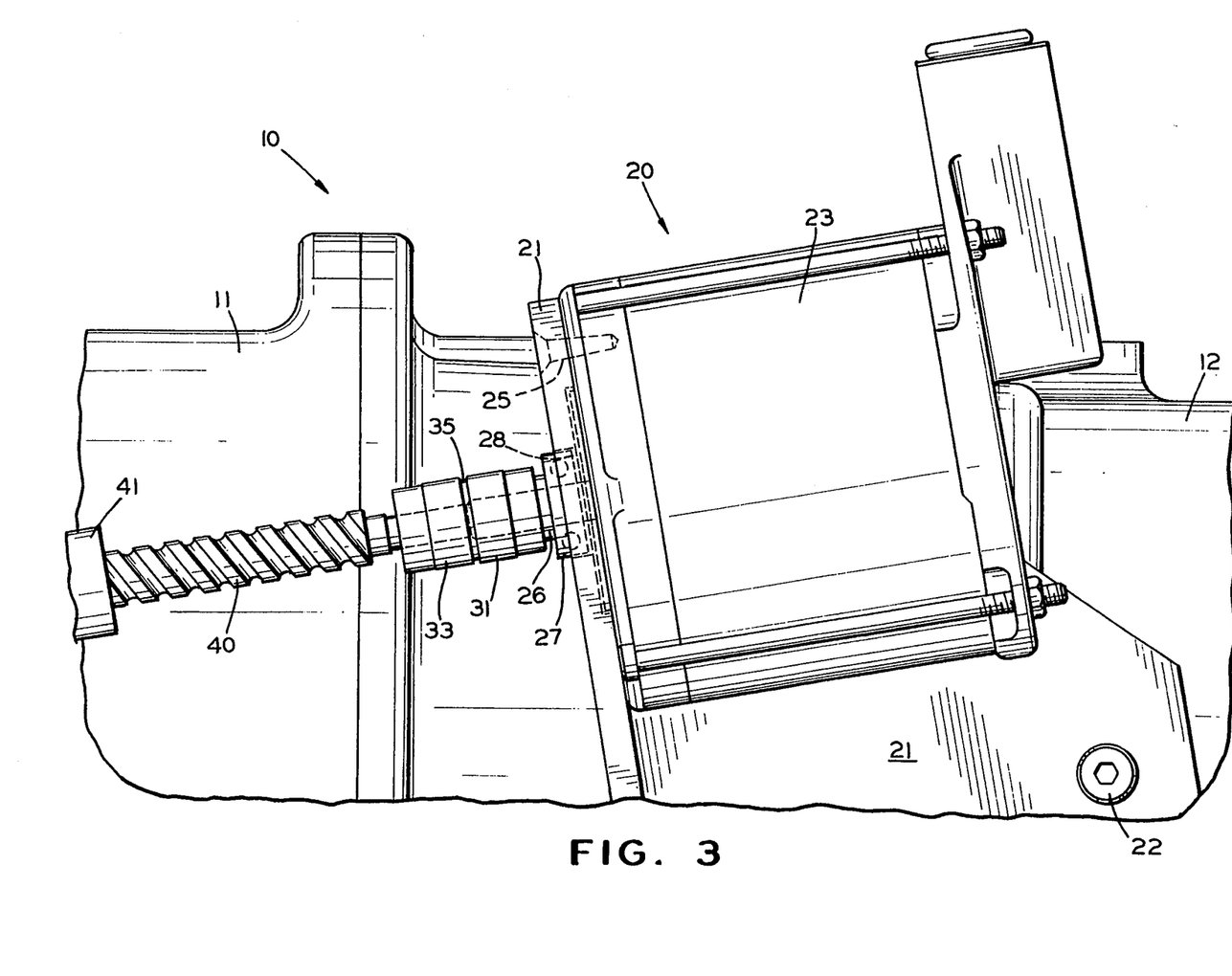
FIG. 3 is an enlarged side elevational view, partially broken away, of the housing and electric actuator assembly shown in FIG. 1.

Referring now to the drawings, there is illustrated in FIGS. 1, 2, and 3 a first embodiment of the invention which includes a hollow housing, indicated generally at 10. The housing 10 is formed from two parts, namely, a clutch casing 11 and a transmission casing 12. The casings 11 and 12 are secured together by any conventional means, such as by a plurality of threaded fasteners (not shown). When secured together, the casings 11 and 12 form an enclosure which is adapted to support both a clutch and a transmission (not shown) therein in a known manner. The clutch and the transmission are conventional in the art and form no part of this invention.

As is well known, the components of the clutch are selectively movable between engaged and disengaged positions. When the clutch is engaged, an input shaft (not shown) from the engine of the vehicle is connected therethrough to drive the transmission. When the clutch is disengaged, the input shaft is disconnected from the transmission. To selectively move the components of the clutch between the engaged and disengaged positions, a rotatable shift shaft 13 is provided. The shift shaft 13 extends outwardly from the clutch casing 11. Rotation of the shift shaft 13 causes engagement and disengagement of the clutch in a known manner, as described above. For the purposes of discussion herein, it is assumed that the clockwise rotation of the shift shaft 13 (when viewing FIG. 1) causes engagement of the clutch, while counter-clockwise movement of the shift shaft 13 (when viewing FIG. 1) causes disengagement thereof. However, it will be appreciated that the clutch may be structured such that clockwise rotation of the shift shaft 13 causes disengagement of the clutch, and vice versa.

A shift arm 14 is connected to the shift shaft 13 for movement therewith. When the shift arm 14 is moved in a first direction (toward the right when viewing FIG. 1), the shift shaft 13 is rotated in a first direction. Such clockwise movement of the shift shaft 13 causes the clutch to become engaged. Similarly, when the shift arm 14 is moved in a second direction (toward the left when viewing FIG. 1), the shift shaft 13 is rotated in a second direction. Such counter-clockwise movement of the shift shaft 13 causes the clutch to become disengaged.

An electric actuator assembly, indicated generally at 20, is mounted on the housing 10 for effecting movement of the shift arm 14 and, consequently, controlling the engagement and disengagement of the clutch. As best shown in FIG. 2, the electric actuator assembly 20 includes a generally L-shaped bracket 21 having first and second legs. The first leg of the bracket 21 is secured to the transmission casing 12 by a first plurality of threaded fasteners 22. The second leg of the bracket 21 extends perpendicularly from the first leg, outwardly from the transmission casing 12. A conventional bi-directional electric motor 23 is secured to the second leg of the bracket 21 by a second plurality of threaded fasteners 25 (only one is illustrated in FIG. 3). As will be explained in detail below, the motor 23 is provided to drive the mechanism for effecting movement of the shift arm 14.

The structure of the electric actuator assembly 20 is illustrated in detail in FIG. 3. As shown therein, the motor 23 includes an output shaft 26 which can be driven to rotate in either of two rotational directions. A conventional encoder 23a may be provided for generating an electrical signal which is representative of the rotational position of the output shaft of the motor 23. The purpose of this encoder 23a will be explained below.

The output shaft 26 of the motor 23 extends through and is rotatably supported by a bearing 27 mounted in a recess 28 formed in the second leg of the bracket 21. The end of the output shaft 26 is connected to a flexible coupling, indicated generally at 30, for rotation therewith. The coupling 30 includes a first collar 31 which is connected to the output shaft 26 of the motor 23 by a set screw 32. The coupling 30 further includes a second collar 33 which is connected to the first collar 31 by a flexible member 35. The flexible member 35 may be embodied as a hollow cylindrical elastomeric hose. The flexible member 35 may be secured to the first and second collars 31 and 33 by any conventional means, such as by adhesive.

A set screw 36 is provided for connecting the second collar 35 to a ball screw shaft 40. Thus, the rotation of the output shaft 26 by the motor 23 causes corresponding rotation of the ball screw shaft 40. The flexible coupling 30 is provided between the output shaft 26 and the ball screw shaft 40 to accommodate axial misalignment therebetween. The flexible coupling 30 also provides vibration isolation between the motor 23 and the ball screw shaft 40.

Referring back to FIGS. 1 and 2, a hollow cylindrical nut 41 is mounted on the ball screw shaft 40. As is well known in the art, the nut 41 has an internal thread formed thereon which cooperates with an external thread formed on the ball screw shaft 40. Consequently, rotation of the ball screw shaft 40 in a first rotational direction causes axial movement of the nut 41 toward the motor 23. Similarly, rotation of the ball screw shaft 40 in a second rotational direction causes axial movement of the nut 41 away from the motor 23.

An enlarged diameter collar 42 is secured to the nut 41 for axial movement therewith. The collar 42 has a pair of posts 43 extending outwardly from the opposed sides thereof. The posts 43 may be embodied as a pair of threaded fasteners secured to the collar 42. The posts 43 extend through respective slots 45 formed in the legs of a generally U-shaped yoke 46. Thus, the yoke 46 is pivotably connected to the collar 42. The yoke 46 is welded or otherwise secured to the upper end of the shift arm 14. As will become apparent below, the cooperation of the posts 43 with the slots 45 formed in the legs of the yoke 46 accommodate the translation of axial movement of the collar 42 to pivoting movement of the shift arm 14.

In operation, the motor 23 is selectively energized and de-energized to operate the clutch. To engage the clutch, the motor 23 is energized to rotate the output shaft 26 and the ball screw shaft 40 in the first rotational direction. As previously discussed, rotation of the ball screw shaft 40 in this direction causes axial movement of the nut 41 toward the motor 23. In turn, the nut 41 pulls the collar 42, the yoke 46, and the shift arm 14 toward the motor 23. Consequently, the shift shaft 13 is rotated in a clockwise direction, when viewing FIG. 1. Such clockwise movement of the shift shaft 13 causes the clutch to become engaged, as described above.

Similarly, to disengage the clutch, the motor 23 is energized to rotate the output shaft 26 and the ball screw shaft 40 in the second rotational direction. As previously discussed, rotation of the ball screw shaft 40 in this direction causes axial movement of the nut 41 away from the motor 23. In turn, the nut 41 pushes the collar 42, the yoke 46, and the shift arm 14 away from the motor 23. Thus, the shift shaft 13 is rotated in a counter-clockwise direction when viewing FIG. 1. Such counter-clockwise movement of the shift shaft 13 causes the clutch to become disengaged, as also described above.

An electronic control circuit (not shown) may be provided for controlling the operation of the motor 23 and, thus, the engagement and disengagement of the clutch. Such control circuit forms no part of this invention. However, the control circuit could include means for actuating the motor 23 to rotate the output shaft 26 in the desired direction in response to some manual operation performed by an operator. The electrical signal from the motor encoder 23a can be fed to the control circuit to provide position feedback control. The control circuit could also preferably include some means for limiting the amount of such rotation so as to prevent the shift shaft 13 from being rotated too far in either direction, depending upon the particular clutch being operated. Any conventional control circuit may be provided for these purposes.

Figure 4:
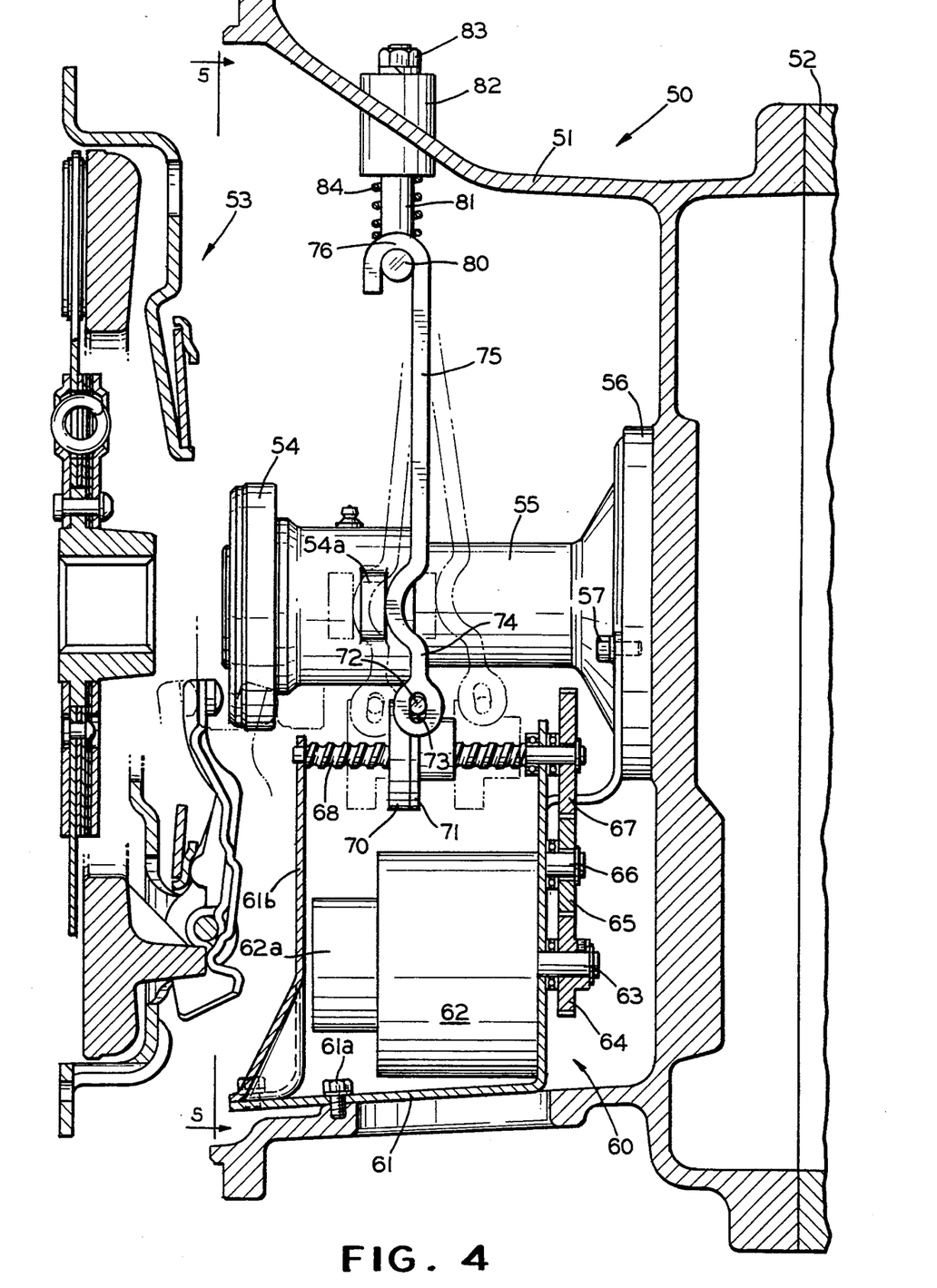
FIG. 4 is a sectional side elevational view of a housing for a clutch and transmission including a second embodiment of an electric actuator assembly for operating the clutch in accordance with this invention.
Figure 5:
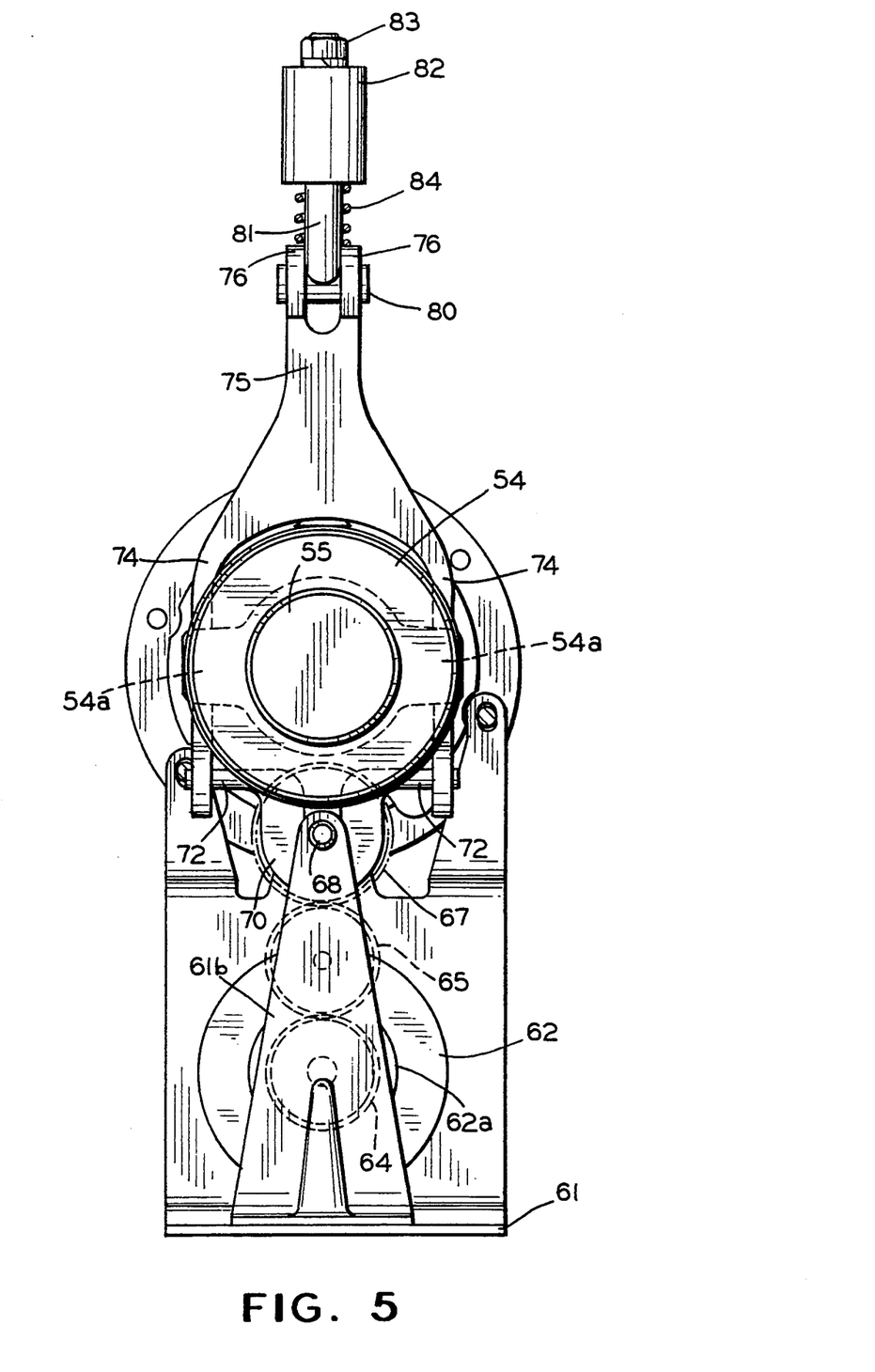
FIG. 5 is a sectional elevational view taken along line 5—5 of FIG. 4.

Referring now to FIGS. 4 and 5, there is illustrated a second embodiment of the invention which also includes a hollow housing, indicated generally at 50. The housing 50 is formed from two parts, namely, a clutch casing 51 and a transmission casing 52. The casings 51 and 52 are secured together by any conventional means, such as by a plurality of threaded fasteners (not shown). When secured together, the casings 51 and 52 form an enclosure which is adapted to support both a clutch, indicated generally at 53, and a transmission (not shown) therein in a known manner. The clutch 53 and the transmission are conventional in the art and form no part of this invention.

As is well known, the components of the clutch 53 are selectively movable between engaged and disengaged positions. When the clutch is engaged, an input shaft (not shown) from the engine of the vehicle is connected therethrough to drive the transmission. When the clutch is disengaged, the input shaft is disconnected from the engine. To selectively move the components of the clutch between the engaged and disengaged positions, a release bearing 54 is provided. The release bearing 54 is generally hollow and cylindrical in shape. As best shown in FIG. 5, the release bearing 54 is formed having a pair of protrusions 54a extending outwardly from the opposed sides thereof. The purpose of these protrusions 54a will be explained below.

The release bearing 54 is slidably mounted on a hollow cylindrical stem portion 55 of a drive gear bearing cap 56. The bearing cap 56 is conventional in the art and is secured to the transmission casing 52 by a plurality of threaded fasteners 57 (only one is illustrated). For the purposes of discussion herein, it is assumed that axial movement of the release bearing 54 toward the clutch 53 (to the left when viewing FIG. 4) causes disengagement of the clutch, while axial movement of the release bearing 54 away from the clutch 53 (to the right when viewing FIG. 4) causes engagement thereof. However, it will be appreciated that the clutch may be structured such that engagement and disengagement of the clutch 53 is effected by opposite axial movements of the release bearing 54.

An electric actuator assembly, indicated generally at 60, is mounted on the housing 50 for effecting movement of the release bearing 54 and, consequently, controlling the engagement and disengagement of the clutch. As best shown in FIG. 4, the electric actuator assembly 60 includes a bracket 61 having a first portion which is secured to the clutch casing 51 by a plurality of threaded fasteners 61a (only one is illustrated). The bracket 61 further includes a second portion which is connected to the bearing cap 56 by the threaded fasteners 57. A conventional bi-directional electric motor 62 is secured to the bracket 61 by a plurality of threaded fasteners (not illustrated). As will be explained in detail below, the motor 62 is provided to drive the mechanism for effecting movement of the release bearing 54.

The motor 62 includes an output shaft 63 which can be driven to rotate in either of two rotational directions. A first gear 64 is mounted on the output shaft 63 for rotation therewith. The first gear 64 meshes with a second gear 65 which is rotatably mounted upon an idler shaft 66 carried on the bracket 61. The second gear 66, in turn, meshes with a third gear 67 which is mounted on a ball screw shaft 68 for rotation therewith. Thus, rotation of the output shaft 63 by the motor 62 causes corresponding rotation of the ball screw shaft 68. By properly selecting the numbers of teeth provided upon each of the gears 64, 65, and 67, the rotational speed of the ball screw shaft 68 can be adjusted relative to the rotational speed of the output shaft 63 of the motor 62. For example, it has been found desirable to provide the gear 64 with forty-eight teeth, the gear 65 with forty-eight teeth, and the gear 67 with sixty teeth. As a result, one and one-quarter revolutions of the output shaft 63 of the motor 62 are required to achieve one revolution of the ball screw shaft 68.

A hollow cylindrical nut 70 is mounted on the ball screw shaft 68. As is well known in the art, the nut 70 has an internal thread formed thereon which cooperates with an external thread formed on the ball screw shaft 68. As a result, rotation of the ball screw shaft 68 in a first rotational direction causes axial movement of the nut 70 toward the clutch 53. Similarly, rotation of the ball screw shaft 68 in a second rotational direction causes axial movement of the nut 70 away from the clutch 53. As best shown in FIG. 5, a generally U-shaped bracket 71 is secured to the nut 70 for movement therewith. The bracket 71 is provided with a pair of posts 72 extending outwardly from the opposed sides thereof. The posts 72 extend through respective slots 73 formed in a pair of lower yoke leg portions 74 formed on the lower end of a shift member 75. Thus, each of the lower yoke leg portions 74 of the shift member 75 is pivotably connected to the bracket 71.

The upper end of the shift member 75 is formed having a pair of upper yoke leg portions 76. Each of the upper yoke leg portions 76 of the shift member 75 is generally C-shaped, extending about a transverse pivot arm 80 secured to the the lower end of a pivot support arm 81. The pivot support arm 81 is, in turn, secured to the clutch casing 51 by a pivot support housing 82 and a threaded fastener 83. A coiled spring 84 is disposed about the pivot support arm 81, extending between the lower end of the pivot support housing 82 and the upper yoke leg portions 76. The spring 84 is provided to exert a force downwardly against the upper yoke leg portions 76 so as to retain them on the pivot arm 80, while permitting the entire shift member 75 to move relative thereto.

In operation, the motor 62 is selectively energized and de-energized to operate the clutch 53. To disengage the clutch 53, the motor 62 is energized to rotate the output shaft 63 and the ball screw shaft 68 in the first rotational direction. As previously discussed, rotation of the ball screw shaft 68 in this direction causes axial movement of the nut 70 toward the clutch 53. Such axial movement causes the shift member 75 to pivot about the pivot arm 80 toward the clutch 53. As a result, the pivot shift member 75 engages the posts 72 of the bracket 71, thus moving the release bearing 54 toward the clutch 53. Such axial movement of the release bearing 54 causes the clutch to become disengaged, as described above.

Similarly, to engage the clutch 53, the motor 62 is energized to rotate the output shaft 63 and the ball screw shaft 68 in the second rotational direction. As previously discussed, rotation of the ball screw shaft 68 in this direction causes axial movement of the nut 70 away from the clutch 53. In turn, the bracket 71 secured to the nut permits the release bearing 54 to move away from the clutch 53, thus causing the clutch to become engaged, as also described above. The same motor encoder 62a and electronic control circuit (not shown) discussed above may be provided for controlling the operation of the motor 62.

In accordance with the provisions of the patent statutes, the principle and mode of operation of this invention have been explained in its preferred embodiment. However, it must be understood that this invention may be practiced otherwise than as specifically explained and illustrated without departing from its spirit or scope.

What is claimed is:

1. A clutch for selectively connecting an input shaft to an output shaft comprising:

A flywheel adapted to be secured to the input shaft for rotation therewith;

a cover connected to said flywheel for rotation therewith;

said slots being formed in said legs, said yoke adapted to be secured to said shift arm for movement therewith.

2. The invention defined in claim 1 wherein said means for rotating said first and second shafts includes a motor.

3. The invention defined in claim 2 wherein said motor is a bi-directional electric motor.

4. The invention defined in claim 2 wherein said first shaft is an output shaft of said motor.

5. The invention defined in claim 1 wherein said second shaft is a bal screw shaft connected to said first shaft for rotation therewith, and further including a nut mounted on said ball screw shaft such that rotational movement of said ball screw shaft causes axial movement of said nut, said collar being connected to said nut.

6. The invention defined in claim 5 wherein said flexible coupling is connected between said first shaft and said ball screw shaft.

7. The invention defined in claim 1 wherein said flexible coupling includes a first collar connected to said first shaft, a second collar connected to said second shaft, and a flexible member connected to said first and second collars.

8. The invention defined in claim 7 wherein said flexible member is an elastomeric member.

9. The invention defined in claim 8 wherein said elastomeric member is a hollow cylindrical hose.

10. The invention defined in claim 1 wherein said means for connecting said collar to said shift arm includes a post extending outwardly from said collar and cooperating with a slot provided on said shift arm.

11. The invention defined in claim 10 wherein said means for connecting said collar to said shift arm further includes a yoke having a leg, said slot being formed in said leg, said yoke adapted to be secured to said shift arm for movement therewith.

12. The invention defined in claim 1 wherein said means for connecting said collar to said shift arm includes a pair of posts extending outwardly from said collar and cooperating with respective slots provided on said shift arm.

13. The invention defined in claim 12 wherein said means for connecting said collar to said shift arm further includes a yoke having a pair of legs, said slots being formed in said legs, said yoke adapted to be secured to said shift arm for movement therewith.

14. An actuator assembly for effecting movement of a release bearing of a clutch having a housing to cause engagement and disengagement thereof comprising:

a shaft;

means for rotating said shaft in first and second rotational directions;

a nut;

means for moving said nut in a first direction when said shaft is rotated in said first rotational direction and for moving said nut in a second direction when said shaft is rotated in said second rotational direction;

a pivot support arm adapted to be connected to the housing of said clutch;

a pivot member including a first end having at least one upper yoke leg portion extending only partially about a portion of said pivot support arm to pivotably support said pivot member on said pivot support arm, said pivot member further including a second end; and means connecting said second end of said pivot member to said nut for translating movement of said nut to pivoting movement of said pivot member, said pivot member adapted to engage the release bearing between said first and second ends thereof so as to move it with said nut to cause engagement and disengagement of the clutch.

15. The invention defined in claim 14 wherein said pivot member includes a lower yoke leg portion having a slot formed therein, said slot adapted to receive a protrusion formed on the release bearing to connect said pivot member to said release bearing.

16. The invention defined in claim 14 wherein said pivot member includes a pair of lower yoke leg portions having respective slots formed therein, said slots adapted to receive respective protrusions formed on the release bearing to connect said pivot member to said release bearing.

17. The invention defined in claim 14 wherein said first end of said pivot member includes a pair of upper yoke leg portions, each extending only partially about a portion of said pivot support arm to pivotably support said pivot member on said pivot support arm.

18. An actuator assembly for effecting movement of a release bearing of a clutch to cause engagement and disengagement thereof comprising:

a housing;

a pivot support arm connected to said housing;

a pivot member including a first end having at least one upper yoke leg portion extending only partially about a portion of said pivot support arm to pivotably support said pivot member on said pivot support arm, said pivot member further including a second end; and means connected to said second end of said pivot member for effecting pivoting movement of said pivot member, said pivot member adapted to engage the release bearing between said first and second ends thereof so as to move it to cause engagement and disengagement of the clutch.

19. The actuator assembly defined in claim 18 wherein said means for effecting pivoting movement of said pivot member includes a rotatable shaft, a nut connected to said pivot member, and means for moving said nut when said shaft is rotated so as to effect pivoting movement of said pivot member.

20. The actuator assembly defined in claim 19 further including means for rotating said shaft in first and second rotational directions, said nut being moved in a first direction when said shaft is rotated in said first rotational direction and in a second direction when said shaft is rotated in said second rotational direction.

21. The invention defined in claim 18 wherein said pivot member includes a lower yoke leg portion having a slot formed therein, said slot adapted to receive a protrusion formed on the release bearing to connect said pivot member to said release bearing.

22. The invention defined in claim 18 wherein said pivot member includes a pair of lower yoke leg portions having respective slots formed therein, said slots adapted to receive respective protrusions formed on the release bearing to connect said pivot member to said release bearing.

23. The invention defined in claim 18 wherein said first end of said pivot member includes a pair of upper yoke leg portions, each extending only partially about a portion of said pivot support arm to pivotably support said pivot member on said pivot support arm.

* * * * *

UNITED STATES PATENT AND TRADEMARK OFFICE
CERTIFICATE OF CORRECTION

PATENT NO. : 5,353,902

DATED : October 11, 1994

INVENTOR(S) : Richard A. Flotow, Curtis L. Fee, and J. Michael Lewis

It is certified that error appears in the above-identified patent and that said Letters Patent is hereby corrected as shown below:

On title page, item [19] "Flowtow et al" should read --Flotow et al--

Item [75] "Richard A. Flowtow" should read --Richard A. Flotow--

Columns 7-8, claim 1, should read as follows:

1. A clutch for selectively connecting an input shaft to an output shaft comprising:

a flywheel adapted to be secured to the input shaft for rotation therewith;

a cover connected to said flywheel for rotation therewith;

a pressure plate disposed between said flywheel and said cover, said pressure plate being connected to said cover for rotation therewith and for axial movement relative thereto between engaged and disengaged positions;

a disc assembly disposed between said pressure plate and said flywheel and adapted to be secured to the output shaft for rotation therewith, said disc assembly being frictionally engaged by said pressure plate and said flywheel when said pressure plate is in said engaged position so as to connect the input shaft to the output shaft;

means for moving said pressure plate between said engaged and disengaged positions, said means for moving including a rotatable shift shaft having a shift arm secured thereto; and an actuator assembly for selectively pivoting said shift arm so as to selectively rotate said shift shaft and thereby move said pressure plate between said engaged and disengaged positions, said actuator assembly including:

a first shaft;

a second shaft;

a flexible coupling connecting said first and second shafts while permitting misalignment therebetween;

UNITED STATES PATENT AND TRADEMARK OFFICE
CERTIFICATE OF CORRECTION

PATENT NO. : 5,353,902

DATED : October 11, 1994

INVENTOR(S) : Richard A. Flotow, Curtis L. Fee and J. Michael Lewis

It is certified that error appears in the above-identified patent and that said Letters Patent is hereby corrected as shown below:

```
        means for rotating said first and second shafts in
first and second rotational directions;
        a collar mounted on said second shaft for movement in a
first direction when said shaft is rotated in said first
rotational direction and for movement in a second direction
when said shaft is rotated in said second rotational
direction; and
        means for connecting said collar to said shift arm for
translating movement of said collar to pivoting movement of
said shift arm to cause engagement and disengagement of the
clutch.

Claim 5, Column 8, Line 14    change "bal" to --ball--.
```

Signed and Sealed this

Twenty-ninth Day of November, 1994

*Attest:*

BRUCE LEHMAN

*Attesting Officer*     *Commissioner of Patents and Trademarks*